Jan. 27, 1959   E. I. CROWLEY ET AL   2,871,106
SAFETY DEVICE
Filed Sept. 26, 1956

INVENTORS,
EDGAR I. CROWLEY
NORMAN W. FRANKE
THOMAS P. JOYCE, JR.
BY

THEIR ATTORNEY

United States Patent Office 2,871,106
Patented Jan. 27, 1959

2,871,106

SAFETY DEVICE

Edgar I. Crowley, Baltimore, Md., and Norman W. Franke and Thomas P. Joyce, Jr., Penn Township, Allegheny County, Pa., assignors to Gulf Research & Development Company, Pittsburgh, Pa., a corporation of Delaware Application September 26, 1956, Serial No. 612,198

4 Claims. (Cl. 23—260)

This invention relates to an improved safety device, particularly a safety device for use in processes carried out at elevated pressures.

In carrying out many chemical reactions it is extremely important that the reaction rate be carefully controlled to assure a satisfactory product and avoid damage to equipment and injury to operating personnel. For example, in the case where a paraffin hydrocarbon is reacted with nitric acid to produce a mixture containing dibasic carboxylic acids, the reaction rate can easily get out of hand and a pressure sufficiently high to damage severely the equipment employed in the reaction can result. It would be extremely attractive, therefore, to provide such processes with means to quench or extinguish such reactions when they proceed at an uncontrollable rate. Our safety device is characterized by the fact that improved means is provided for introducing a quenching or diluting fluid in the reaction area when the reaction occurring therein is proceeding at an uncontrollable rate.

Figure 1:
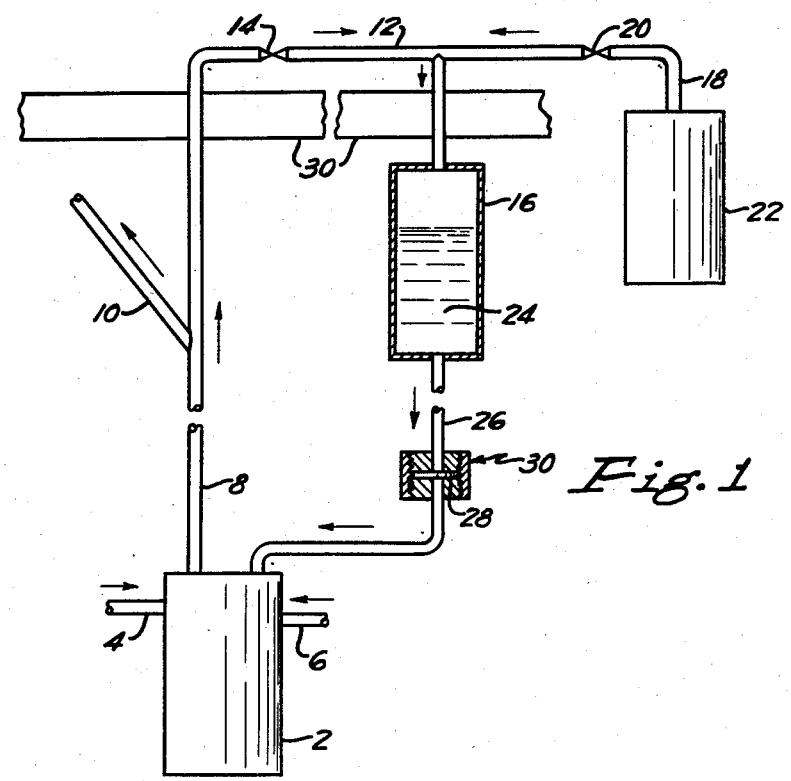
Figure 2:
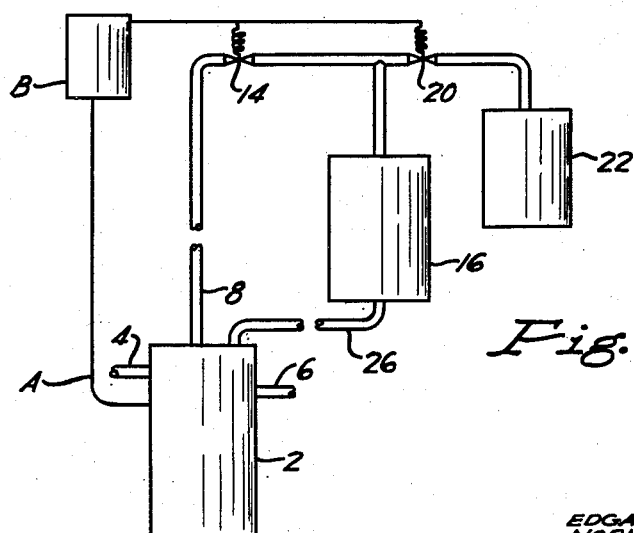

The invention will be fully understood by reference to the accompanying drawings which illustrate preferred embodiments thereof. The drawings are hereby incorporated in and made part of the present specification. Figure 1 illustrates a preferred embodiment of the device of the invention, while Figure 2 illustrates automatic means for closing valves therein.

Referring to Figure 1, reference numeral 2 designates a reactor, suitable for carrying out chemical reactions therein, provided with a number of inlets 4 and 6 for introducing reactants into the vessel. During the reaction off-gases and vapors are produced in the reaction vessel, and these are removed therefrom by line 8 and withdrawn from the system by line 10. If desired, condensing means can be mounted in lines 8, 10 or both to condense the gases and vapors leaving reactor 2 and the condensed product can be recycled thereto.

As a continuation of line 8, there is provided a line 12, containing valve 14, leading to reservoir 16. A line 18, provided with valve 20, and leading from storage vessel 22, is tapped into line 12 at a point prior to its entry into reservoir 16. Storage vessel 22 is filled with a fluid, preferably gaseous, such as nitrogen, under pressure. Reservoir 16 contains therein a suitable fluid 24, such as water, which will quench or dilute the reaction mixture in reactor 2 when introduced therein.

A line 26 is provided, joining reservoir 16 to reactor 2. Mounted in line 26 is a frangible or blowout disc 28 held in place by any suitable means such as a union 30. Disc 28 can be made of any suitable material which will break or fracture under a moderate pressure, such as 50 to 100 pounds differential pressure. A plastic material, such as a sheet of polytetrafluoroethylene, or a metal sheet made of steel or copper, is satisfactory. If desired, a barricade 30 can be provided to isolate the reactor 2 as well as other parts of the system.

Operation of the device will be described by reference to a process for producing dibasic carboxylic acids by reaction of a paraffin hydrocarbon with nitric acid, although the apparatus of course need not be restricted thereto but has general applicability. A mixture obtained by oxidizing a paraffin wax, having a melting point of 132° F., in air at a temperature of 160° C. for a time sufficient to obtain an air-oxidized mixture having a saponification number of 232, is charged by line 4 into reactor 2. Nitric acid having a concentration of 60 percent is charged into reactor 2 by line 6 in a weight ratio, relative to the air-oxidized mixture, of 5 to 1. The reactants are maintained in reactor 2 at a temperature of 110° C. and a pressure of 500 pounds per square inch with the resultant production of dibasic carboxylic acids and gases comprising nitrogen, nitrogen oxide, nitrogen dioxide, carbon monoxide, carbon dioxide, etc. The dibasic carboxylic acids remain in reactor 2 but the gases are removed therefrom by line 8 and subsequently line 10.

Valve 14 is initially open, while valve 20 is maintained in closed position. A body of water is maintained in reservoir 16, and a sheet of polytetrafluoroethylene having a thickness of 0.005 inch and capable of rupturing under a pressure differential of 50 pounds per square inch is mounted in line 26 by means of the union 30. It is apparent, therefore, that the pressure in reservoir 16 is equal to that in reactor 2, and the only pressure across the disc 28 is the head of the water in reservoir 16. When the temperature in reactor 2 rises to about 150° C., which is considered excessive under the circumstances, the operator closes valve 14 and simultaneously opens valve 20. Nitrogen under a pressure of 2000 pounds per square inch in storage vessel 22 therefore exerts its pressure on reservoir 16 and in turn on the disc 28. The pressure differential across the disc is thus about 1500 pounds per square inch and sufficient to rupture the same and permit water to flow therethrough from reservoir 16 to reactor 2, thereby quenching the reaction in reactor 2.

Valves 14 and 20 need not be operated manually but can be operated automatically by any common automatic means if desired, for example, as in Figure 2. Valves 14 and 20 in such case would be replaced by solenoid valves, respectively, which would be operated by temperature limiting device B. The latter in turn is linked with a thermocouple A mounted in reactor 2. In operation, temperature limiting device B is set to operate at a temperature desired to quench the reaction in reactor 2. When the temperature rises above such level, the temperature limiting device B operates to close valve 14 and open valve 20 automatically permitting water to enter reactor 2 and quench the reaction.

The present device has many advantages. It permits safe and efficient control of a dangerous reaction from a distant point. The use of a safety disc or safety valve to relieve the pressure of the reaction is not preferred since many chemical reactions, such as the nitric acid oxidation of paraffin hydrocarbons, become so rapid that such disc or safety valve cannot vent it quickly enough to avoid damage to equipment and/or injury to personnel. The use of a disc such as that shown at 28 has several advantages over valves at this point. The disc 28 makes a positive, leakfree seal which is not limited as to location, since it requires no mechanical connection for operation and can be located at a considerable distance by small gas lines as in the present case.

Obviously, many modifications and variations of the invention, as hereinafter set forth, can be made without departing from the spirit and scope thereof, and, therefore, only such limitations should be imposed as are indicated in the appended claims.

We claim:

1. A reaction system comprising a reactor, a reservoir and a storage vessel; means communicating between said reactor and the upper portion of said reservoir and between said storage vessel and the upper portion of said reservoir; means operable to regulate such communication; second means communicating between the lower portion of said reservoir and said reactor, means in said second communicating means normally preventing communication between said reservoir and said reactor but adapted to be fractured and permit communication therebetween upon the application of an elevated pressure differential thereacross.

2. A reaction system comprising a reactor, a reservoir and a storage vessel; pipe means communicating between said reactor and the upper portion of said reservoir and between said storage vessel and the upper portion of said reservoir, valve means operable to regulate such communication; second pipe means communicating between the lower portion of said reservoir and said reactor; and a disc mounted in said second pipe means normally preventing communication between said reservoir and said reactor but adapted to be fractured and permit communication therebetween upon the application of an elevated pressure differential thereacross.

3. A safety device for use in combination with a reactor which comprises means communicating with said reactor for removing gaseous products therefrom, a reservoir adapted to contain a quenching fluid, means communicating from said reactor to said reservoir to permit the pressure in said reactor to exert its influence on said reservoir, means in said latter means to regulate communication between said reactor and said reservoir, a storage vessel adapted to contain a fluid under pressure in excess of that existing in said reactor and said reservoir, means communicating between said storage vessel and said reservoir, means in said latter means adapted to regulate communication between said storage vessel and said reservoir, second means communicating between said reservoir and said reactor, and means mounted in said latter means normally stopping communication between said reservoir and said reactor but adapted to be fractured and permit communication therebetween upon the application of an elevated pressure differential thereacross.

4. A safety device for use in combination with a reactor which comprises pipe means communicating with said reactor for removing gaseous products therefrom, a reservoir adapted to contain a quenching fluid, pipe means communicating from said reactor to said reservoir to permit the pressure in said reactor to exert its influence on said reservoir, valve means in said pipe means to regulate communication between said reactor and said reservoir, a storage vessel adapted to contain a fluid under pressure in excess of that existing in said reactor and said reservoir, means communicating between said storage vessel and said reservoir, valve means in said latter means adapted to regulate communication between said storage vessel and said reservoir, second pipe means communicating between said reservoir and said reactor, and a disc mounted in said latter pipe means normally preventing communication between said reservoir and said reactor but adapted to be fractured and permit communication therebetween upon the application of an elevated pressure differential thereacross.

References Cited in the file of this patent
UNITED STATES PATENTS

| 2,317,836 | Weaver | Apr. 27, 1943 |
| 2,507,132 | Woodward | May 9, 1950 |